No. 758,889. PATENTED MAY 3, 1904.
D. J. BARRY.
PUSH WAGON OR CART.
APPLICATION FILED JUNE 23, 1903.
NO MODEL.
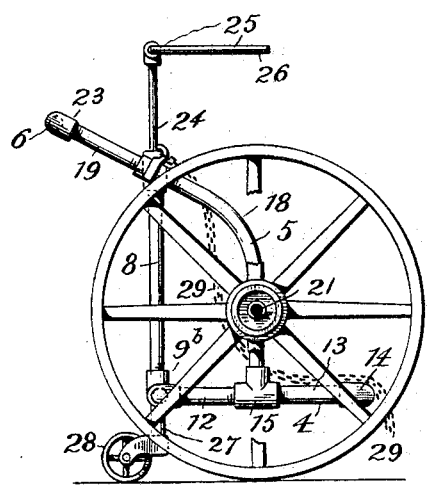
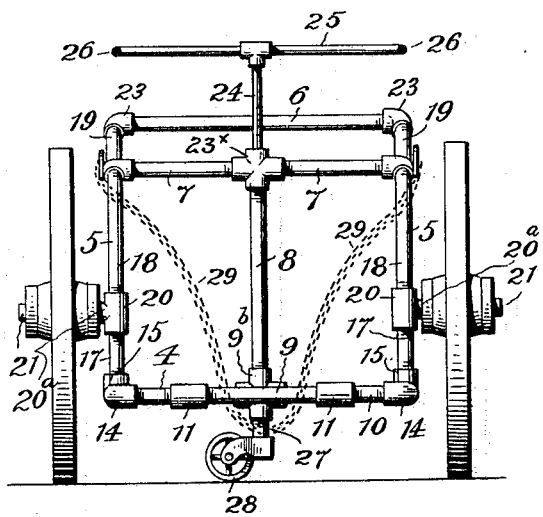
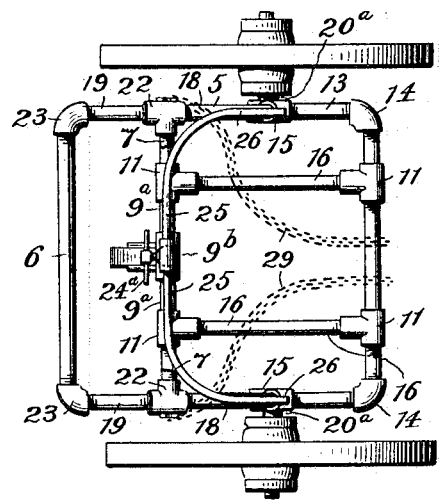
Witnesses:
Jas. E. Hutchinson
Inventor:
Daniel Joseph Barry
By
ATTORNEYS No. 758,889. Patented May 3, 1904.

UNITED STATES PATENT OFFICE.

DANIEL JOSEPH BARRY, OF NEW YORK, N. Y.

PUSH WAGON OR CART.

SPECIFICATION forming part of Letters Patent No. 758,889, dated May 3, 1904.

Application filed June 23, 1903. Serial No. 162,778. (No model.)

*To all whom it may concern:*

Be it known that I, DANIEL JOSEPH BARRY, a citizen of the United States, residing at 816 West End avenue, in the city, county, and State of New York, have invented a certain new and useful Improvement in Push Wagons or Carts, of which the following is a full, clear, and exact specification.

This invention relates to improvements in push wagons or carts for street-cleaning purposes.

The object of the invention is to produce an improved push wagon or cart which will be light, strong, and durable, cheap of construction, and which will be adapted for removably supporting and transporting cans or bags within which the collected refuse and dirt may be placed.

The invention comprises the details of construction and arrangement of parts hereinafter described, and particularly pointed out in the claim.

In the accompanying drawings, which illustrate the invention, Figure 1 is a side elevation. Fig. 2 is a front view, and Fig. 3 is a plan view.

From the figures it will be seen that the frame of the cart is made of hollow tubular sections of pipe threaded at the ends, so as to screw to the elbows at all points of junction.

The frame includes a platform 4, upwardly-extending side members 5, by which the wheels are carried and which curve backwardly to the handle portion 6, and a cross-bar 7, connecting these side members and forming, with the vertical post 8, a back. The front and rear bars of the platform are each formed of a plurality of sections of pipe, the front bar comprising a central section 9 and side sections 10, which are connected together by the coupling members 11. The rear bar is the same except that the central section is divided into two parts $9^a$, connected by a coupling $9^b$. The side bars are each composed of two sections 12 and 13, connected to the ends of the front and rear bars by elbow-couplings 14 and to each other by a T-coupling 15.

The couplings 11 are T-couplings and are connected by cross bars or tubes 16, which, together with the front and side bars, form the platform or support for the can.

The side members 5 comprise each three pipe-sections 17, 18, and 19, the first section, 17, being screwed into the T-coupling 15 at one end and into a similar T-coupling 20 at the other end. A tubular axle 21 is screwed into each outwardly-turned socket $20^a$ of the coupling 20, and upon these axles the wheels are journaled, being held thereon by nuts screwed upon the outer ends of the axles. The central sections 18 are screwed into the couplings 20 at their lower ends, and from this point they extend upwardly and rearwardly to the couplings 22, which are arranged directly over the rear bar or side of the supporting-platform. The third sections, 19, connect the T-couplings 22 with elbow-couplings 23, which in turn are connected to the handle-bar 6.

The cross-bar 7 consists of two sections, which connect with the T-couplings 22 at their outer ends and with the horizontal sockets of the four-arm coupling $23^\times$ at their inner ends. The vertical tube or standard 8 extends between the coupling $23^\times$ and $9^b$ and, in addition to bracing the parts, forms a guide and support for a telescoping rod 24, carrying at its upper end a curved bag-supporting bar 25, having projections 26 for engaging the bag.

A section 27, connected to the lower socket of the coupling member $9^b$, carries at its rear end a caster-wheel 28.

In order to hold the can upon the platform, lugs are secured to the couplings 22, to which are secured the ends of a chain 29. The vertical rod 24 may be adjusted to any desired height, according to the size of bag used, and held in its adjusted position by a clamping-screw $24^a$.

The nuts for confining the wheels upon the hollow axles are in the shape of caps, which close the ends, so that lubricating material may be inserted to find its way through openings in the axle to the interior of the hubs, thus keeping the wheels lubricated.

Having thus described my invention, what I claim is—

In a hand-cart a platform comprising front and rear bars, side bars, and intermediate bars composed of metal tubing connected by couplings, side members connected to the platform by couplings and extending upwardly and rearwardly, a handle-bar at the rear ends of said side members, hollow axles secured to said side members with wheels journaled thereon, a cross-bar connecting said side members, a vertical tube connecting said cross-bar and the rear side of the platform, and a sliding rod guided in said vertical tube, and a bag-supporting device carried at the upper end of said sliding rod, substantially as described.

In witness whereof I have hereunto set my hand in presence of two witnesses.

DANIEL JOSEPH BARRY.

Witnesses:
VICTOR J. DOWLING,
EDWARD D. DOWLING.